US012543695B2

(12) United States Patent
Bahlenberg et al.

(10) Patent No.: US 12,543,695 B2
(45) Date of Patent: Feb. 10, 2026

(54) MILK EXTRACTING SYSTEM AND COMPUTER IMPLEMENTED METHOD

(71) Applicant: DELAVAL HOLDING AB, Tumba (SE)

(72) Inventors: Peter Bahlenberg, Tumba (SE); Carl Oskar Paulrud, Tumba (SE)

(73) Assignee: DeLaval Holding AB, Tumba (SE)

( * ) Notice: Subject to any disclaimer, the term of this patent is extended or adjusted under 35 U.S.C. 154(b) by 367 days.

(21) Appl. No.: 18/252,317

(22) PCT Filed: Nov. 9, 2021

(86) PCT No.: PCT/SE2021/051123
§ 371 (c)(1),
(2) Date: May 9, 2023

(87) PCT Pub. No.: WO2022/103317
PCT Pub. Date: May 19, 2022

(65) Prior Publication Data
US 2023/0404021 A1 Dec. 21, 2023

(30) Foreign Application Priority Data
Nov. 10, 2020 (SE) .................................. 2051310-7

(51) Int. Cl.
A01J 5/04 (2006.01)
A01J 5/007 (2006.01)

(52) U.S. Cl.
CPC ............. A01J 5/048 (2013.01); A01J 5/0075 (2013.01)

(58) Field of Classification Search
CPC ................................ A01J 5/048; A01J 5/0075
See application file for complete search history.

(56) References Cited

U.S. PATENT DOCUMENTS 5,042,428 A  8/1991  Van Der Lely et al.
6,009,832 A  1/2000  Innings et al.
(Continued)

FOREIGN PATENT DOCUMENTS

EP     3620046 A1    3/2020
JP     2012005420 A  1/2012
(Continued)

OTHER PUBLICATIONS

Search Report for SE Application No. 2051310-7 dated Jun. 3, 2021, 3 pages.
(Continued)

Primary Examiner — Gary Collins
(74) Attorney, Agent, or Firm — NIXON & VANDERHYE

(57) ABSTRACT

A milk extracting system and computer-implemented method of adjusting the vacuum pressures applied respectively at different teat cups for milking the teats of an animal during a milk extraction procedure, where a teat-specific milk flow value is determined for each individual teat during the milk extraction, based on measurements received from respective milk flow meters, each determined teat specific milk flow value is compared with a first threshold limit, and when a determination is made that all of the teat specific milk flow values exceed the first threshold limit the vacuum pressure at each teat cup is adjusted to a high flow vacuum pressure level.

13 Claims, 9 Drawing Sheets

(56) References Cited

U.S. PATENT DOCUMENTS

| | | | |
|---|---|---|---|
| 2002/0148408 A1 | 10/2002 | Gompper et al. | |
| 2004/0025792 A1 | 2/2004 | Sjölund et al. | |
| 2004/0168647 A1 | 9/2004 | Brown et al. | |
| 2008/0127896 A1* | 6/2008 | Petterson | A01J 5/007 119/14.08 |
| 2011/0011343 A1* | 1/2011 | Sandberg | A01J 5/007 119/14.08 |
| 2012/0210939 A1 | 8/2012 | Sandberg et al. | |
| 2013/0036975 A1* | 2/2013 | Carlsson | A01J 5/01 119/14.08 |
| 2014/0373787 A1* | 12/2014 | Petterson | A01J 5/048 119/14.08 |

FOREIGN PATENT DOCUMENTS

| | | |
|---|---|---|
| WO | 0119169 A1 | 3/2001 |
| WO | 0207505 A1 | 1/2002 |
| WO | 2006068582 A1 | 6/2006 |
| WO | 2008051137 A1 | 5/2008 |
| WO | 2018007242 A1 | 1/2018 |
| WO | 2019156619 A1 | 8/2019 |

OTHER PUBLICATIONS

International Search Report for PCT/SE2021/051123 dated Jan. 21, 2022, 4 pages.
Written Opinion of the ISA for PCT/SE2021/051123 dated Jan. 21, 2022, 6 pages.
Office Action and Search Report, issued in Chinese Patent Application No. 202180075694.3 dated Apr. 14, 2025.

* cited by examiner (Cont. from Figure 4A)

- Detect once the respective vacuum pressure has been adjusted into the high flow vacuum pressure level that the teat specific milk flow value of one teat of the animal is lower than the first threshold limit. — 407

- Adjust the respective vacuum pressure at each teat cup to a detachment vacuum pressure level when detecting that all the teat specific milk flow values exceed the first threshold limit. — 408

- Detach all teat cups from the teats of the animal. — 409

- Adjust the respective vacuum pressure at each teat cup, into any one of the entry vacuum pressure level or the high flow vacuum pressure level for a limited period of time when the teat cups have been detached from the teats. — 410

Fig. 4B

MILK EXTRACTING SYSTEM AND COMPUTER IMPLEMENTED METHOD

CROSS-REFERENCE TO RELATED APPLICATIONS

This application is the U.S. national phase of International Application No. PCT/SE2021/051123 filed Nov. 9, 2021 which designated the U.S. and claims priority to SE Patent Application No. 2051310-7 filed Nov. 10, 2020, the entire contents of each of which are hereby incorporated by reference.

TECHNICAL FIELD

This document discloses a milk extracting system and a computer-implemented method. More particularly, a milk extracting system and a computer implemented method are described, for adjusting a respective vacuum pressure at each teat cup of a respective teat of an animal during milk extraction, in the milk extracting system; wherein the respective vacuum pressure is set to an entry vacuum pressure level and one teat cup is applied onto each teat of the animal.

BACKGROUND

On a dairy farm, milk is typically extracted from the animals by putting a teat cup with a liner on each teat of the animal and apply milking vacuum under the tip of the teat, in addition to a pulsation vacuum. Hereby, the rhythmical suckling of a calf is imitated so that sucking by the milking vacuum is interrupted by rhythmical motions, opening and closing of the liner caused by the pulsation vacuum. Consequently, the teats are exposed to massage which stimulates oxytocin release of the animal, which in turn activates the milk ejection reflex. Also, congestion in the teat end is prevented by the applied massage.

It is desired to evacuate the milk from the animal as fast as possible (for using the milking equipment efficiently and allowing a maximum number of animals to be milked) while avoiding injury on the teats due to excessive milking vacuum.

A recently developed milking method is called boost. Boost means that the milk extraction starts with applying milking vacuum at an entry vacuum pressure level to the teats and when the milk flow of the udder has increased over a threshold limit, the milking vacuum is increased up to a high flow vacuum pressure level. When the milk flow of the udder then decreases under the threshold limit, the milking vacuum is decreased to a detachment vacuum pressure level and the teat cups are released from the udder; a process which is facilitated by the less intense detachment vacuum.

However, the milk flow of the teats of an animal is typically not equally distributed between the teats. In an extreme case, all the milk flow of the udder may come from one single teat during at least a moment of the boost. The applied common high flow vacuum pressure level may then harm the teat/s that has low milk flow.

Not only the milk flow is unequally distributed, but also the increase rate of the milk flow during stimulation of the respective teat is different.

It may be observed that the teat size and/or shape may be different on the udder of a single animal; however, the same teat cup/liner size is typically applied on all the teats independently of the actual teat size. Thus, some teats may have a size and shape which better fits the teat cup liner, thus being better stimulated by the rhythmical motions of the pulsation vacuum than teats having a very deviating size and/or shape, leading to a longer time period before a high alveoli milk flow is reached.

These above-mentioned features may coincide and enforce each other, which exacerbates the problems.

It would be desired through further investigations and development to evolve a concept for avoiding that boost is applied in a manner harming one, some or all of the teats, while evacuating the milk of the animal efficiently.

SUMMARY

It is therefore an object of this invention to solve at least some of the above problems and improve milking of an animal.

According to a first aspect of the invention, this objective is achieved by a milk extracting system. The milk extracting system comprises a plurality of teat cups, configured to fit on a respective teat of an animal during milk extraction. The milk extracting system also comprises a plurality of milk evacuation tubes, wherein each milk evacuation tube is connected to a respective teat cup. Also, the milk extracting system also comprises a plurality of milk evacuation tubes, wherein each milk evacuation tube is connected to a respective teat cup. The milk extracting system furthermore comprises a vacuum pump, configured to generate a vacuum pressure. In addition, the milk extracting system furthermore comprises a milk tank, connected to each of the teat cups via the respective milk evacuation tube, and also connected to the vacuum pump. The milk extracting system also comprises a plurality of valve devices, wherein each valve device is configured to adjust a vacuum pressure at a teat cup. Further, the milk extracting system comprises a plurality of milk flow meters, each configured to measure milk flow of one respective teat of the animal. Additionally, the milk extracting system comprises a processing node communicatively connected to each of the milk flow meters. The processing node is configured to determine a teat specific milk flow value of each individual teat of the animal, during milk extraction of the teat, based on milk flow measurements of each respective milk flow meter. The processing node is also configured to compare each determined teat specific milk flow value with a first threshold limit and detect that all of the determined teat specific milk flow values exceed the first threshold limit. The processing node is furthermore configured to generate a command to a vacuum regulator, to adjust a respective vacuum pressure at each of the teat cups, from an entry vacuum pressure level to a high flow vacuum pressure level, when detecting that all the determined teat specific milk flow values exceed the first threshold limit. The milk extracting system furthermore comprises the vacuum regulator, configured to implement adjustments of the respective vacuum pressure at each of the teat cups via a respective valve device, based on instructions obtained from the processing node.

By applying the high flow vacuum pressure only when the milk flow of all individual teats of the animal exceeds the threshold limit, it is avoided that high flow vacuum pressure is applied onto a teat that has a low or no flow (i.e. a milk flow lower than the threshold limit), which could harm the animal. The thereby safely applied high flow vacuum pressure reduce milking time of each animal being served in a milking station/milking robot (in comparison with conventional no-boost milking), which makes it possible to serve more animals per time unit by the milking system. Thereby, by adapting the milking process to the milk flow of each individual teat, boost is implemented in a gentle manner, radically improving milk extraction.

In an implementation of the milk extracting system according to the first aspect, the processing node may also be configured to once the respective vacuum pressure has been adjusted into the high flow vacuum pressure level, detect that one of the determined teat specific milk flow values is lower than a second threshold limit and generate a command to the vacuum regulator to adjust the respective vacuum pressure at each of the teat cups from the high flow vacuum pressure level to the entry vacuum pressure level, when detecting that one of the determined teat specific milk flow values is lower than the second threshold limit.

It is thereby avoided that the high flow vacuum pressure is applied when the milk flow of an individual teat is lower than the threshold limit, which otherwise could harm the teat with low/no milk flow.

In yet an implementation of the milk extracting system according to the first aspect, the processing node may be additionally configured to detect that one of the determined teat specific milk flow values is lower than a third threshold limit and generate a command to the vacuum regulator to adjust the respective vacuum pressure at each of the teat cups to a detachment vacuum pressure level, when detecting that one of the determined teat specific milk flow values is lower than the third threshold limit.

Thanks to the provided solution, it is thereby avoided that the high flow vacuum pressure is applied when the milk flow of an individual teat is lower than a threshold limit, which otherwise could harm the teat with low/no milk flow. When the pressure level at the teat cups is set to detachment vacuum pressure level, the teat cups are to be released from the teats, leading to a high pass-through rate for the milking station.

In another implementation of the milk extracting system according to the first aspect, the processing node may be configured to detect that all teat cups have been detached from the teats of the animal. Also, the processing node may be configured to generate a command to the vacuum regulator, to adjust the respective vacuum pressure at each of the teat cups into any one of the entry vacuum pressure level or the high flow vacuum pressure level for a limited period of time when having detected that all the teat cups have been detached from the teats.

When the respective milk cup has been released from the teats, it is thanks to the provided solution that it is possible to suck the milk remaining in the milking tubes, thereby avoiding that it gets wasted on the floor.

In yet another implementation of the milk extracting system according to the first aspect, the first threshold limit is equal to or higher than the second threshold limit and wherein the second threshold limit is equal to or higher than the third threshold limit.

The milk extracting system according to an implementation of the first aspect, may comprise a sensor configured to detect position of each teat of the animal. The milk extracting system may also comprise a teat cup placing device, communicatively connected to the sensor, configured to sequentially put each of the teat cups onto the respective teat of the animal, based on sensor detections made by the sensor. The processing node may be additionally configured to determine which teat of the animal that is expected to require the longest time to increase the milk flow when starting the milking process, up to the first threshold limit. The processing node may also be configured to generate an instruction to the teat cup placing device to start placing the first teat cup onto the determined teat before sequentially applying the other teat cups onto the rest of the teats.

According to a second aspect of the invention, this objective is achieved by a computer-implemented method of adjusting a respective vacuum pressure at each teat cup of a respective teat of an animal during milk extraction, in a milk extracting system. The respective vacuum pressure is set to an entry vacuum pressure level and one teat cup is applied onto each teat of the animal. The method comprises the step of determining a teat specific milk flow value of each individual teat of the animal, during milk extraction of the teat, based on a received respective measurement of milk flow meters, each configured to measure milk flow of one respective teat of the animal. Further, the method comprises comparing each determined teat specific milk flow value with a first threshold limit. The method also comprises detecting that all of the determined teat specific milk flow values exceed the first threshold limit. In addition, the method further comprises adjusting the respective vacuum pressure at each teat cup from the entry vacuum pressure level to a high flow vacuum pressure level when detecting that all the determined teat specific milk flow values exceed the first threshold limit.

By applying the high flow vacuum pressure only when the milk flow of all teats exceeds the threshold limit, it is avoided that high flow vacuum pressure is applied onto a teat that has a low or no flow, which could harm the animal. The thereby safely applied high flow vacuum pressure enable a shorter milking time of each animal being served in a milking station/milking robot, which makes it possible to serve more animals per time unit. Thereby, by adapting the milking process to the milk flow of each individual teat, boost is implemented in a gentle manner, radically improving milk extraction.

In an implementation of the method according to the second aspect, the respective vacuum pressure at each teat cup has been adjusted into the high flow vacuum pressure level. The method comprises detecting that one of the determined teat specific milk flow values is lower than a second threshold limit. The respective vacuum pressure at each teat cup may be adjusted from the high flow vacuum pressure level to the entry vacuum pressure level when making the detection, when the determined teat specific milk flow values is lower than the second threshold limit.

It is thereby avoided that the high flow vacuum pressure is applied when the milk flow of an individual teat is lower than a threshold limit, which otherwise could harm the teat with low/no milk flow.

In yet another implementation of the method according to the second aspect, the method comprises detecting that one of the determined teat specific milk flow values is lower than a third threshold limit. The respective vacuum pressure at each teat cup may be adjusted to a detachment vacuum pressure level when making the detection, when the determined teat specific milk flow values is lower than the third threshold limit. The method also comprises detaching all teat cups from the teats of the animal.

Thanks to the provided solution, it is thereby avoided that the high flow vacuum pressure is applied when the milk flow of an individual teat is lower than a threshold limit, which otherwise could harm the teat with low/no milk flow. When the pressure level at the teat cups is set to detachment vacuum pressure level, the teat cups are to be released from the teats, leading to a high pass-through rate for the milking station.

In another implementation of the method according to the second aspect, the method also comprises adjusting the respective vacuum pressure at each teat cup into any one of the entry vacuum pressure level or the high flow vacuum pressure level for a limited period of time when the teat cups have been detached from the teats.

When the respective milk cup has been released from the teats, it is thanks to the provided solution possible to suck the milk in the milking tubes, thereby avoiding that it gets wasted on the floor.

In an implementation of the method according to the second aspect, the first threshold limit is equal to or higher than the second threshold limit and wherein the second threshold limit is equal to or higher than the third threshold limit.

In yet an implementation of the method according to the second aspect, a sensor is configured to detect position of each teat of the animal and a teat cup placing device, communicatively connected to the sensor, is configured to sequentially put each of the teat cups onto the respective teat of the animal, based on sensor detections made by the sensor. The method also comprises determining which teat of the animal that is expected to require the longest time of increasing the milk flow when starting the milking process, up to the first threshold limit. The method also comprises applying the first teat cup onto the determined teat before sequentially applying the other teat cups onto the rest of the teats.

According to another aspect of the invention, this objective is achieved by a computer program. The computer program comprises instructions which, when the computer program is executed by a computer, cause the computer to carry out the steps of the method according to the second aspect when the computer program is run on the computer.

According to yet an aspect of the invention, this objective is achieved by a computer-readable storage medium. The computer-readable storage medium comprises instructions which, when executed by a computer, cause the computer to carry out the steps of the method according to the second aspect.

Hereby, a time efficient, yet teat friendly milk extraction is provided.

Other advantages and additional novel features will become apparent from the subsequent detailed description.

FIGURES

Embodiments of the invention will now be described in further detail with reference to the accompanying figures, in which:

FIG. 4B is a second part of a flow chart, schematically illustrating method steps of a method according to an embodiment.

DETAILED DESCRIPTION

Embodiments of the invention described herein are defined as a milk extracting system and a computer-implemented method, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
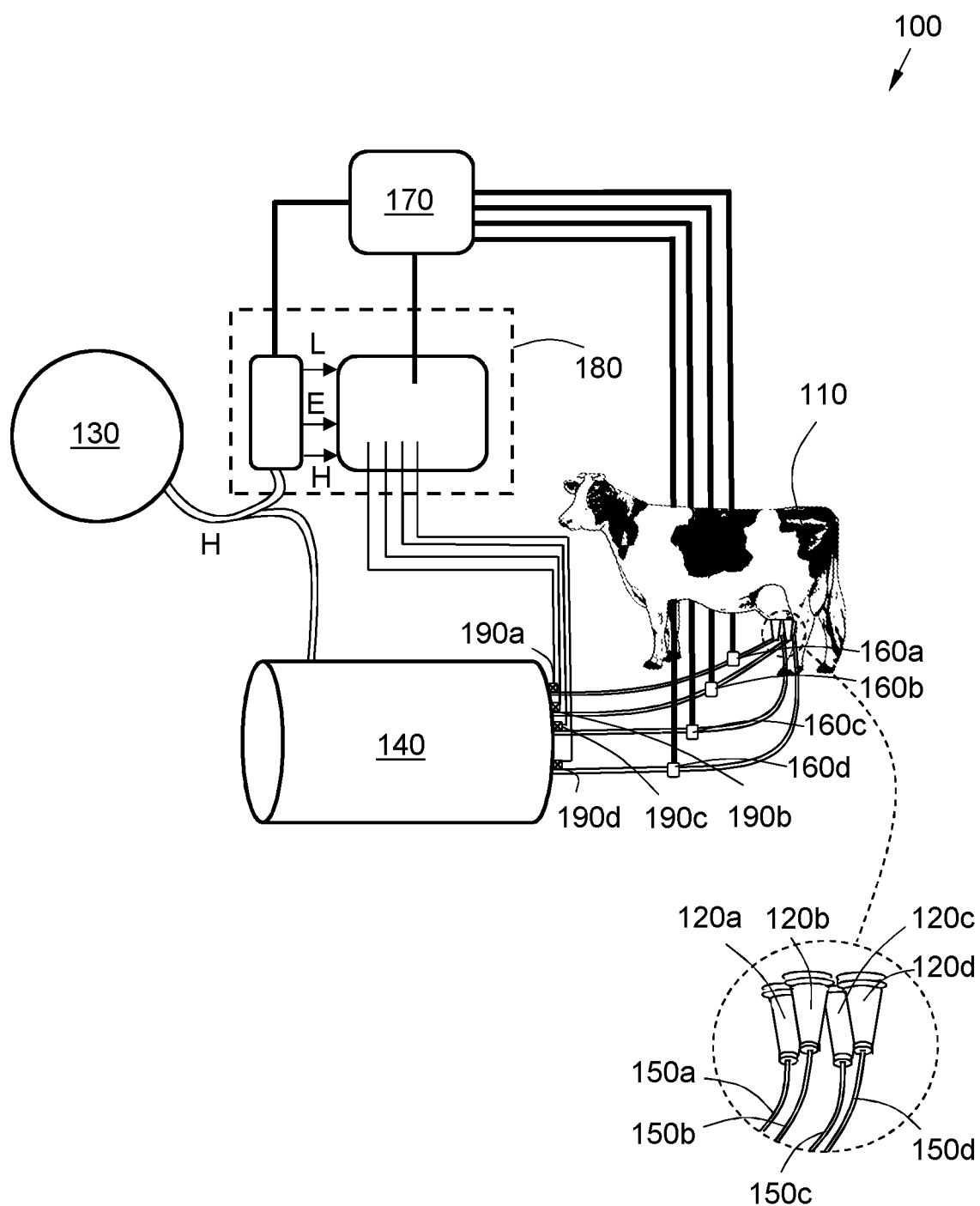
FIG. 1A illustrates a milk extracting system according to an embodiment, in a scenario wherein milk is extracted from the animal.

FIG. 1A illustrates a milk extracting system 100 in a scenario wherein milk is extracted from an animal 110. The animal 110 may be comprised in a herd of animals for dairy farming at a farm. The milk extracting system 100 may with advantage, although not necessarily, be implemented in an automatic milking facility arranged for voluntary milking of freely strolling animals 110, wherein the animals 110 may visit the milking facility/milk extracting system 100 in order to be milked when desired.

"Animal" may be any arbitrary type of domesticated female mammal such as e.g. cow, goat, sheep, camel, horse, dairy buffalo, donkey, yak, etc. The animal 110 may have four teats, as for example cows, or two teats, such as for example goats and/or sheep. Other animals 110 may have other numbers of teats.

The milk extracting system 100 comprises a plurality of teat cups 120a, 120b, 120c, 120d. The number of teat cups 120a, 120b, 120c, 120d is typically identical with the number of teats of the animal 110 to be milked within the milk extracting system 100. Each teat cup 120a, 120b, 120c, 120d is configured to fit on a respective teat of the animal 110 during milk extraction. A liner may be applied at each teat cup 120a, 120b, 120c, 120d, to ascertain good fit between the teat and the teat cup 120a, 120b, 120c, 120d.

Each teat cup 120a, 120b, 120c, 120d is connected to a respective milk evacuation tube 150a, 150b, 150c, 150d, leading evacuated milk to a connected milk tank 140. The milk tank 140 is in turn connected to a vacuum pump 130 that has generated and/or continuously generates a vacuum pressure or milking vacuum within the milk tank 140. The vacuum pressure of the milk tank 140 may thereby be maintained at a substantially constant level.

The expressions "vacuum pressure" and/or "milking vacuum" in the current context refers to the vacuum, or under-pressure in comparison with the environmental atmospheric pressure, used to extract milk from the teats.

When the teat cups 120a, 120b, 120c, 120d are about to be mounted on the respective teat, an entry vacuum pressure may be applied, to enable the teat cup 120a, 120b, 120c, 120d to stick on to the teat and to start evacuating milk from the teat. The same vacuum level is applied via the teat cups 120a, 120b, 120c, 120d to all teats throughout the milking process.

A pulsating vacuum pressure may also be applied when the teat cups 120a, 120b, 120c, 120d have been mounted on the animal teats. The pulsating pressure levels applied to a pulsation chamber via a short pulse tube in the teat cup 120a, 120b, 120c, 120d may in some embodiments vary between a pressure higher than the milking vacuum, such as e.g. atmospheric pressure, during the rest phase D, while the pressure level during the milking phase B may be equal to, or higher (i.e. less under-pressure) than the milking vacuum in different embodiments. The arrangements for applying pulsating vacuum is not illustrated.

Thus, sucking is interrupted by rhythmical motions, opening and closing, of the liner in the teat cup 120a, 120b, 120c, 120d. The force exerted by the collapsed liner causes a massage to the teat. Consequently, the teats are exposed to massage and congestion (e.g. of blood) in the teat end is prevented while oxytocin release and milk ejection is stimulated by the rhythmical movements of the collapsing and opening liner in combination with the applied milking vacuum, mimicking calf suckling.

It is desired to extract the milk of the animal 110 efficiently, during as short time as possible (to allow for more animals per time unit to be served by the milk extracting system 100), without harming or hurting the teats. A methodology that has been developed to satisfy these demands is referred to as "boost", a kind of milk-flow controlled milking.

Thus, the milk extraction can be made more efficient when a greater vacuum level of the milking vacuum is introduced when the milk flow exceeds a certain threshold limit, i.e. the so-called boost vacuum or high flow vacuum pressure, where the sub-pressure is increased in relation to the standard milking vacuum level, or entry vacuum pressure as it also may be referred to as, i.e. to a level even further below the atmospheric pressure. When the milking session is about to end, a detachment vacuum pressure may be applied to enable smooth teat cup take-off.

Thus, a number of different vacuum levels may be applied in addition to the atmospheric pressure level exerted on the teats when they are not being milked.

According to the provided solution, the vacuum pressure at each of the teat cups 120a, 120b, 120c, 120d is increased from the entry vacuum pressure level to a high flow vacuum pressure level when the milk flow of all teats of the animal 110 exceeds a first threshold limit. Thus, boost vacuum is applied on the teats during their top-flow period during the milking. The entry vacuum pressure may be set to about 38-48 kPa, such as for example 45 kPa; the high flow vacuum pressure level may be set to about 50-60 kPa, such as for example 55 kPa and the first threshold limit may be set to about 350-600 g/min, such as for example 500 g/min for each of the teats.

It is hereby avoided that a teat is exposed for high flow vacuum pressure/boost vacuum before the milk flow exceeds the first threshold limit. The high milk flow of the teat is the reason why the milking vacuum could be increased without causing harm to the teat. Thereby a gentle treatment of the animal teats is ascertained, yet enabling application of boost vacuum/high flow vacuum pressure which ameliorates and streamline the milking session, as the milk thereby is evacuated in shorter time than if entry vacuum pressure would have been applied throughout all the milking.

The vacuum pressure of each teat cup 120a, 120b, 120c, 120d may be adjusted throughout the milking process by a respective valve device 190a, 190b, 190c, 190d, acting on the attached respective milk evacuation tube 150a, 150b, 150c, 150d, extending between the teat cup 120a, 120b, 120c, 120d and the milk tank 140. The valve device 190a, 190b, 190c, 190d may for instance comprise a respective shut-off valve for controlling the extraction of milk. Thus, the vacuum pressure at each teat may be adjusted individually, albeit substantially simultaneously.

The milk extracting system 100 also comprises a plurality of milk flow meters 160a, 160b, 160c, 160d, each configured to measure milk flow of one respective teat of the animal 110. Each milk flow meter 160a, 160b, 160c, 160d may be applied on some segment of the corresponding milk evacuation tube 150a, 150b, 150c, 150d thereby being able to measure the amount of milk evacuated from each respective teat, per time unit.

The milk extracting system 100 comprises a processing node 170 such as a computer. The processing node 170 is communicatively connected to each of the milk flow meters 160a, 160b, 160c, 160d for instance via a wireless connection based on radio or optical technique, or a wired connection implemented by electric cable or optic fibre. The processing node 170 may thereby continuously or at repeated moments in time determine milk flow of each teat of the animal 110 on which the teat cup 120a, 120b, 120c, 120d is applied, by obtaining milk flow measurements through the milk evacuation tube 150a, 150b, 150c, 150d connected to the teat cup 120a, 120b, 120c, 120d, made by the milk flow meter 160a, 160b, 160c, 160d. The processing node 170 may also determine the total amount of evacuated milk from each teat at a milking session, for example; and/or the time each teat needs from commencement of the milking process, up to a limit, and/or to alveoli milk let-down.

The processing node 170 is configured to compare each determined teat specific milk flow value of each teat with a first threshold limit. The processing node 170 is also configured to detect that all of the determined teat specific milk flow values of all teats of the animal 110 exceed the first threshold limit. When this occurs, it means that alveoli milk is flowing from all teats and an increased vacuum pressure (i.e. decreased pressure) may be applied on the teats in order to stimulate and accelerate milk flow.

Figure 1B:
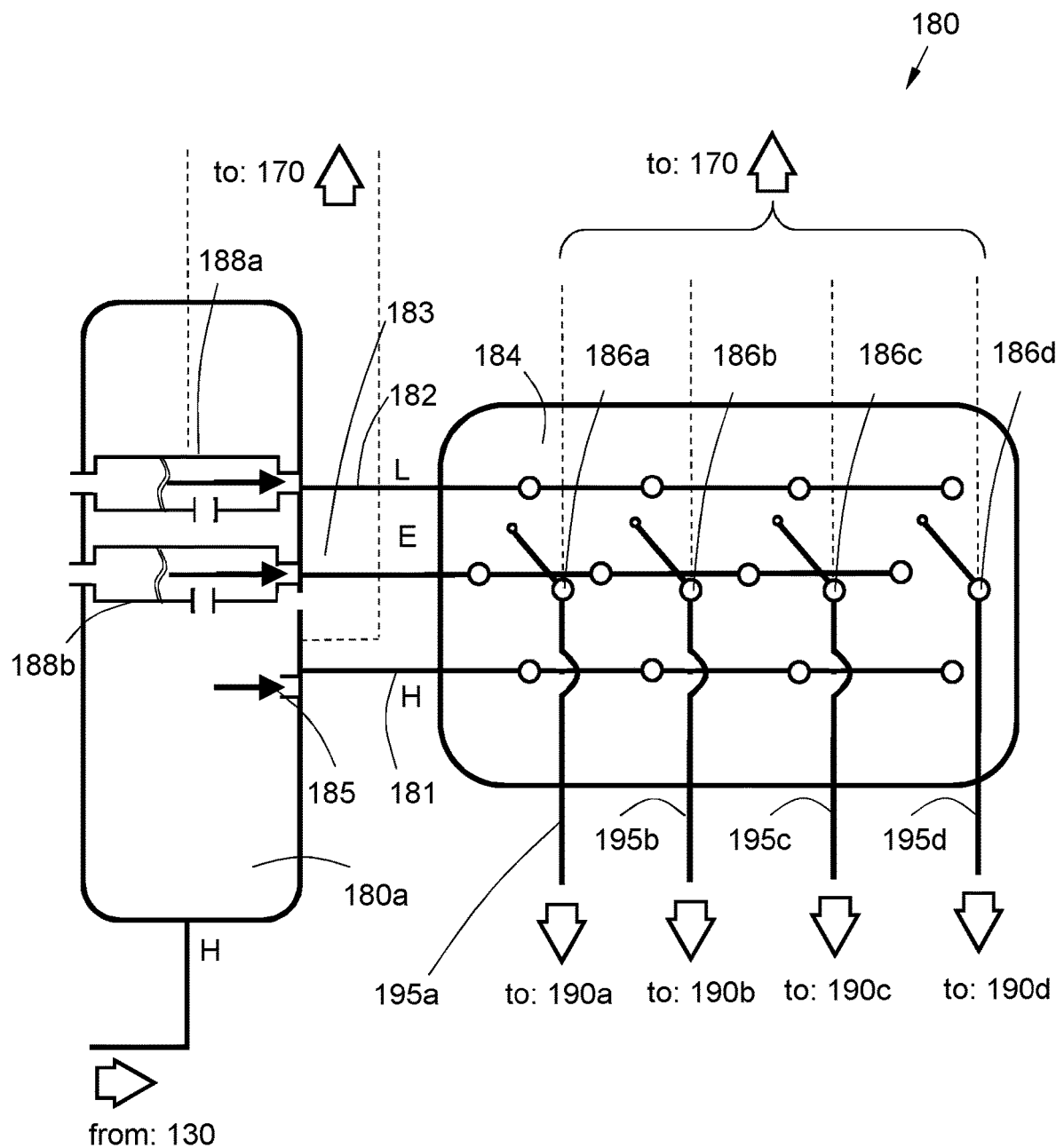
FIG. 1B illustrates details of a milk extracting system according to an embodiment.

The processing node 170 is configured to generate a command to a vacuum regulator 180 comprised in the milk extracting system 100, described more in detail in FIG. 1B, to adjust the respective vacuum pressure at each of the teat cups 120a, 120b, 120c, 120d, from the entry vacuum pressure level to the high flow vacuum pressure level, when detecting that all the determined teat specific milk flow values exceed the first threshold limit.

The processing node 170 is with general advantage configured to effect the above-described procedure in an automatic manner by executing a computer program. Therefore, according to some embodiment, the processing node 170 may comprise a memory unit, i.e. non-volatile data carrier, storing the computer program, which, in turn, may contain software for making a processing circuitry in the form of at least one processor in the processing node 170 to execute the above-described actions when the computer program is run on the processing circuitry.

The vacuum regulator 180 is configured to implement adjustments of the respective vacuum pressure at each of the teat cups 120a, 120b, 120c, 120d via a respective valve device 190a, 190b, 190c, 190d, based on instructions obtained from the processing node 170.

The adjustment of the vacuum pressure applied on the teats is thereby determined by a computer implemented method which is performed in the processing node 170, based on continuous monitoring of milk flow measurements of milk evacuated from each teat made by the respective milk flow meter 160a, 160b, 160c, 160d and comparisons with threshold limits.

The vacuum pump 130 generates a vacuum pressure which is equal to the boost vacuum, or high flow vacuum pressure H, for example about 55 kPa, which is provided and maintained continuously in the milk tank 140 and at a first air pressure tube 181, via a first part 180a of the vacuum regulator 180.

A respective selector 186a, 186b, 186c, 186d in a second section 184 of the vacuum regulator 180 may be set to either the first air pressure tube 181, providing high flow vacuum pressure H, a second air pressure tube 182, providing detachment vacuum L, or a third air pressure tube 183 providing entry vacuum pressure E. The processing node 170 may be communicatively connected to each of the selectors 186a, 186b, 186c, 186d for instance via a wireless connection based on radio or optical technique, or a wired connection implemented by electric cable or optic fibre. Based on selection signals provided by the processing node 170, the respective valve device 190a, 190b, 190c, 190d is provided with either high flow vacuum pressure H, entry vacuum pressure E or detachment vacuum L, which then via the respective milk evacuation tubes 150a, 150b, 150c, 150d is provided to the teat cups 120a, 120b, 120c, 120d.

A valve device 188a of the first part 180a of the vacuum regulator 180 may regulate the output vacuum pressure provided to the second air pressure tube 182, to the detachment vacuum L, by maintaining the valve 188a in an intermediate position, mixing the high flow vacuum pressure H with atmosphere pressure.

The vacuum regulator 180 may regulate the output vacuum pressure provided via the third air pressure tube 183 to the entry vacuum pressure E by maintaining the valve 188b in an intermediate position, mixing the high flow vacuum pressure H with atmosphere pressure.

The first part 180a of the vacuum regulator 180 may comprise an optional shut off valve 185, for discontinuing the high flow vacuum pressure H provided via the first air pressure tube 181 and a respective intermediate air tube 195a, 195b, 195c, 195d to the respective valve device 190a, 190b, 190c, 190d.

The valve device 190a, 190b, 190c, 190d, or shut-off valve as it also may be referred to as, is provided via the respective intermediate air tube 195a, 195b, 195c, 195d with either high flow vacuum pressure H, entry vacuum pressure E or detachment vacuum L, based on how the respective selector 186a, 186b, 186c, 186d of the second section 184 of the vacuum regulator 180 has been set by the processing node 170. The generated vacuum is then provided via the respective milk evacuation tubes 150a, 150b, 150c, 150d to the corresponding teat cup 120a, 120b, 120c, 120d.

This is merely an arbitrary example of how different vacuum levels H, E, L may be selected and provided. Many other implementations and/or different amount of vacuum levels may be made in other embodiments.

The processing node 170 may be configured to, once the respective vacuum pressure at each of the teat cups 120a, 120b, 120c, 120d has been adjusted into the high flow vacuum pressure level H, detect that one of the determined teat specific milk flow values is lower than a second threshold limit.

The second threshold limit may be set to about 300-600 g/min per teat, such as for example 500 g/min for each of the teats. The second threshold limit may be set to the same level as the first threshold limit, or alternatively to a lower milk flow per time unit.

The processing node 170 may also configured to generate a command to the vacuum regulator 180 to adjust the respective vacuum pressure at each of the teat cups 120a, 120b, 120c, 120d from the high flow vacuum pressure level H to the entry vacuum pressure level E when detecting that one single teat specific milk flow value is lower than the second threshold limit.

An advantage by decreasing the vacuum pressure at each of the teat cups 120a, 120b, 120c, 120d from high flow vacuum pressure H to entry vacuum pressure E when the milk flow per time unit of one teat is lower than the second threshold limit is that it is avoided that any teat of the animal 110 is harmed due to high vacuum pressure H when the milk flow is low; while yet allowing milk to be evacuated based on the applied entry vacuum pressure E. Hereby, rational and fast milking is achieved, yet without harming the teats of the animal 110.

The processing node 170 may in some embodiments be configured to, detect that one of the determined teat specific milk flow values of one individual teat is lower than a third threshold limit. The processing node 170 may also be configured to generate a command to the vacuum regulator 180 to adjust the respective vacuum pressure at each of the teat cups 120a, 120b, 120c, 120d to a detachment vacuum pressure level L.

The detachment vacuum pressure level L may be set to approximately 10-20 kPa, such as for example about 15 kPa. The third threshold limit may in some embodiments be identical with the first and/or second threshold limit, i.e. about 300-600 g/min per teat, such as for example 500 g/min for each of the teats. Alternatively, the third threshold limit may be set to a lower milk flow per time unit than the first threshold limit, e.g. to about 200-300 g/min, such as for example 240 g/min.

By detecting that the milk flow per time unit of one single teat is lower than the third threshold limit and then set the vacuum pressure to the detachment vacuum pressure level L, it is avoided that the teat is harmed, yet providing rational and time-efficient milking, ensuring a high number of animals being served per time unit by the milk extracting system 100.

After having terminated the milking session, the processing node 170 may also be configured to detect that all teat cups 120a, 120b, 120c, 120d have been detached from the teats of the animal 110, in some embodiments. The detachment of the teat cups 120a, 120b, 120c, 120d may be detected/confirmed by a sensor, for example a camera; and/or by detecting a lack of milk flow passing the milk flow meters 160a, 160b, 160c, 160d. Also, the processing node 170 may be configured to generate a command to the vacuum regulator 180, to adjust the respective vacuum pressure at each of the teat cups 120a, 120b, 120c, 120d into any one of the entry vacuum pressure level E or the high flow vacuum pressure level H for a limited period of time such as for example 5-10 seconds, when having detected that all the teat cups 120a, 120b, 120c, 120d have been detached from the teats 210a, 210b, 210c, 210d.

Thereby, milk that may remain in the milk evacuation tube 150a, 150b, 150c, 150d is sucked into the milk tank 140, instead of being wasted on the floor.

Figure 2:
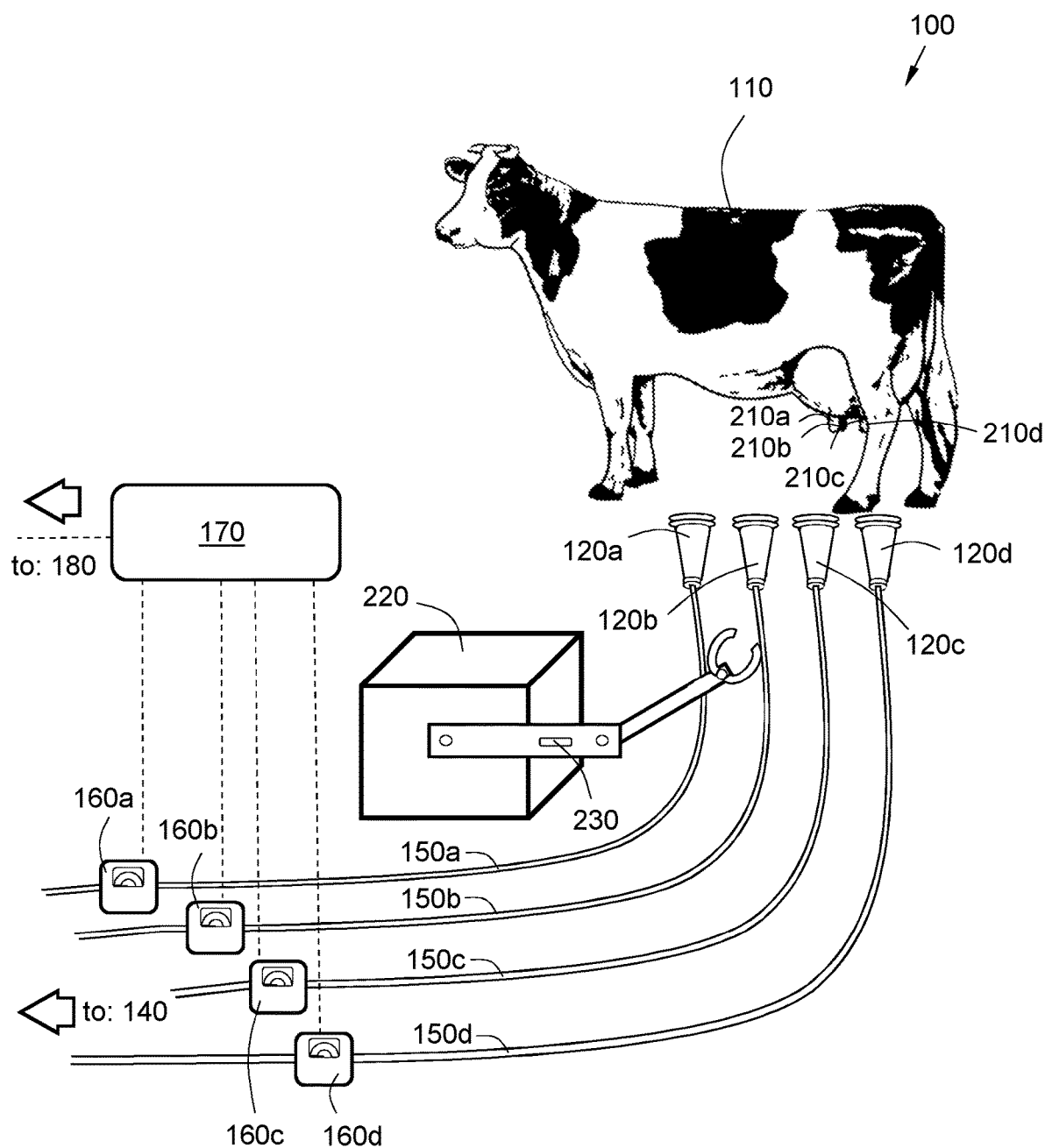
FIG. 2 illustrates details of a milk extracting system according to an embodiment.

FIG. 2 illustrates a milk extracting system 100 a teat cup placing device 220 such as a milking robot, which is communicatively connected to a sensor 230, such as a camera, video camera, lidar, radar, infrared camera, etc. The sensor 230 is configured to detect position of each teat 210a, 210b, 210c, 210d of the animal 110.

In the illustrated non-limiting embodiment, teat cup placing device 220 is embodied as a milking robot, which may be part of an Automatic Milking System (AMS), sometimes also referred to as a Voluntary Milking System (VMS).

The teat cup placing device 220 may be communicatively connected to the sensor 230, via a wired or wireless connection, thereby obtaining information concerning the respective position of the animal teat 210a, 210b, 210c, 210d. The teat cup placing device 220 may be configured to sequentially put each of the teat cups 120a, 120b, 120c, 120d onto the respective teat 210a, 210b, 210c, 210d of the animal 110, based on sensor detections made by the sensor 230. The teat cups 120a, 120b, 120c, 120d may be kept in a storage magazine or similar storage zone, where the teat cup placing device 220 may pick it up one at the time and place it onto one of the teats 210a, 210b, 210c, 210d and repeat this until all teat cups 120a, 120b, 120c, 120d have been mounted.

The processing node 170 may in some embodiments be configured to determine which teat 210a, 210b, 210c, 210d of the animal 110 which is expected to require the longest time to increase the milk flow when starting the milking process, up to the first threshold limit.

This information concerning the milk extraction curve of each teat 210a, 210b, 210c, 210d of each individual animal 110 at the farm may be stored in, for example a digital memory or database, communicatively connected to or comprised in the processing node 170, and later retrieved therefrom.

The digital memory may store historical milk extraction data of at least one teat 210a, 210b, 210c, 210d of at least one animal 110 at the farm, associated with an identity reference of the particular animal 110. The stored milk extraction data may for example comprise a time estimation of the time it takes for each teat 210a, 210b, 210c, 210d, from placement of the teat cup 120a, 120b, 120c, 120d, until reaching a milk flow per time unit corresponding to the first threshold limit. In other embodiments, the stored milk extraction data may comprise an identification reference of the teat 210a, 210b, 210c, 210d being the slowest, historically, to reach a milk flow per time unit corresponding to the first threshold limit.

The animal 110 may be identified by an animal identifying device which may be attached to the animal 110 in some embodiments, e.g. in a necklace around the neck of the animal 110, under the hide of the animal 110, as ear tag/-s, around the tail of the animal 110 and/or around any, some or all of the legs of the animal 110, etc.

The animal identifying device may comprise a transponder, such as a Radio-Frequency Identification (RFID) device in some embodiments. The transponder may comprise electronically stored information for uniquely (at least uniquely within the farm) identifying the animal 110. Such transponder may be active or passive. Other per se known identification methods and/or devices may be applied in different embodiments.

The reader may then provide the identity of the animal 110, as obtained from the identification device, to the processing node 170, over a wired or wireless communication interface.

The processing node 170 may in addition be configured to generate an instruction to the teat cup placing device 220, to start placing the first teat cup 120a, 120b, 120c, 120d onto the determined teat 210a, 210b, 210c, 210d before sequentially applying the other teat cups 120a, 120b, 120c, 120d onto the rest of the teats 210a, 210b, 210c, 210d.

By putting the first teat cup 120a, 120b, 120c, 120d onto the teat 210a, 210b, 210c, 210d estimated to require the longest time milk ejection in the teat cup 120a, 120b, 120c, 120d to reach the milk flow per time unit corresponding to the first threshold limit, the period of time for which boost could be applied is reached earlier for the other teats 210a, 210b, 210c, 210d, leading to a more efficient and brief milking process, yet without risking to harm the teats 210a, 210b, 210c, 210d due to excessive vacuum pressure.

In yet some alternative embodiments, the processing node 170 may be configured to place the teat cups 120a, 120b, 120c, 120d sequentially onto the teats 210a, 210b, 210c, 210d in order of time lag it takes for each respective teat 210a, 210b, 210c, 210d to reach the milk flow per time unit corresponding to the first threshold limit. Thus, the teat 210a, 210b, 210c, 210d being the slowest to reach the first threshold limit may be placed firstly by the teat cup placing device 220. Thereafter, the second slowest, third slowest, etc., may be placed.

The milking session of the animal 110 is thereby further streamlined and improved, allowing for an extended period of milking at the high flow vacuum level H, yet without risking to harm the teats 210a, 210b, 210c, 210d due to excessive vacuum pressure.

Figure 3A:
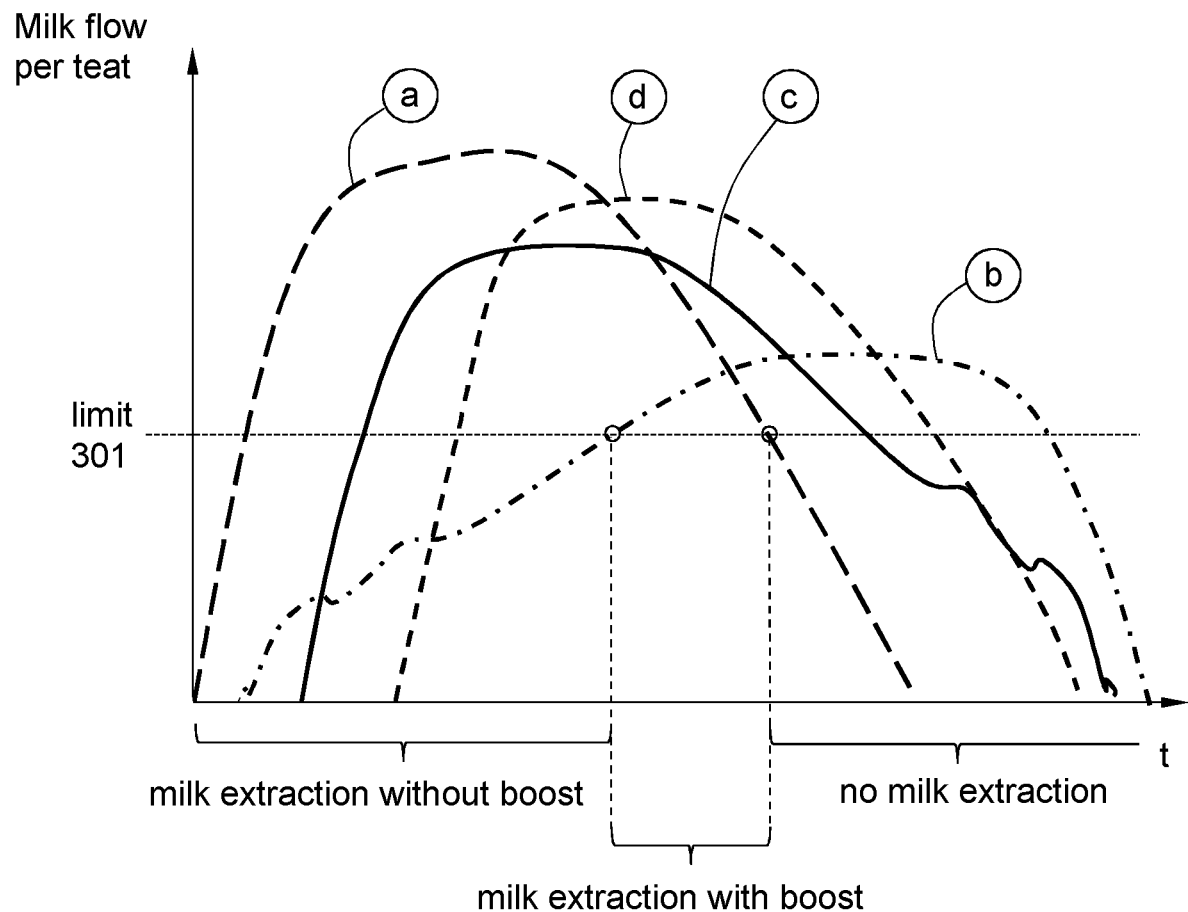
FIG. 3A is a diagram that illustrates examples of milk flow per time unit per teat during milk extraction according to some examples.

FIG. 3A schematically illustrates milk flow per time unit per teat of an animal 110. The animal 110 in this case has four teats 210a, 210b, 210c, 210d. Four teat cups 120a, 120b, 120c, 120d has been mounted sequentially one at the time onto the teats 210a, 210b, 210c, 210d in an order indicated by the a-d, associated with each respective teat specific milk curve in the FIG. 3A. When mounting the teat cups 120a, 120b, 120c, 120d entry vacuum E may be applied. The first teat cup 120a is applied on an arbitrary first teat a, at the origin in the diagram.

The milk flow of the first teat a is fast and firmly raising, passing a first threshold limit 301 and up to a plateau, after which the milk flow starts decreasing. During the peak or plateau in the graph, the milk flow per teat of the first teat a may be for example about 0.75-1.5 kg milk per minute.

The milk flow of the second teat b is however apparently slow, thereby not reaching a milk flow exceeding the first threshold limit 301 until after the respective milk flows of both the third c and the fourth d teats have reached the first threshold limit 301.

The second teat b thereby is the last one to reach the first threshold limit 301. For not harming the second teat b, the boost is not triggered until all four teats 210a, 210b, 210c, 210d has reached a milk flow exceeding the first threshold limit 301. The vacuum pressure is then adjusted to the high flow vacuum pressure level H, thereby realising the milk extraction with boost.

According to the embodiment illustrated in FIG. 3A, the vacuum pressure may be decreased from boost vacuum (high flow vacuum pressure level H) to a detachment vacuum pressure level L when the milk flow of the first teat a has decreased below the first threshold limit 301.

Figure 3B:
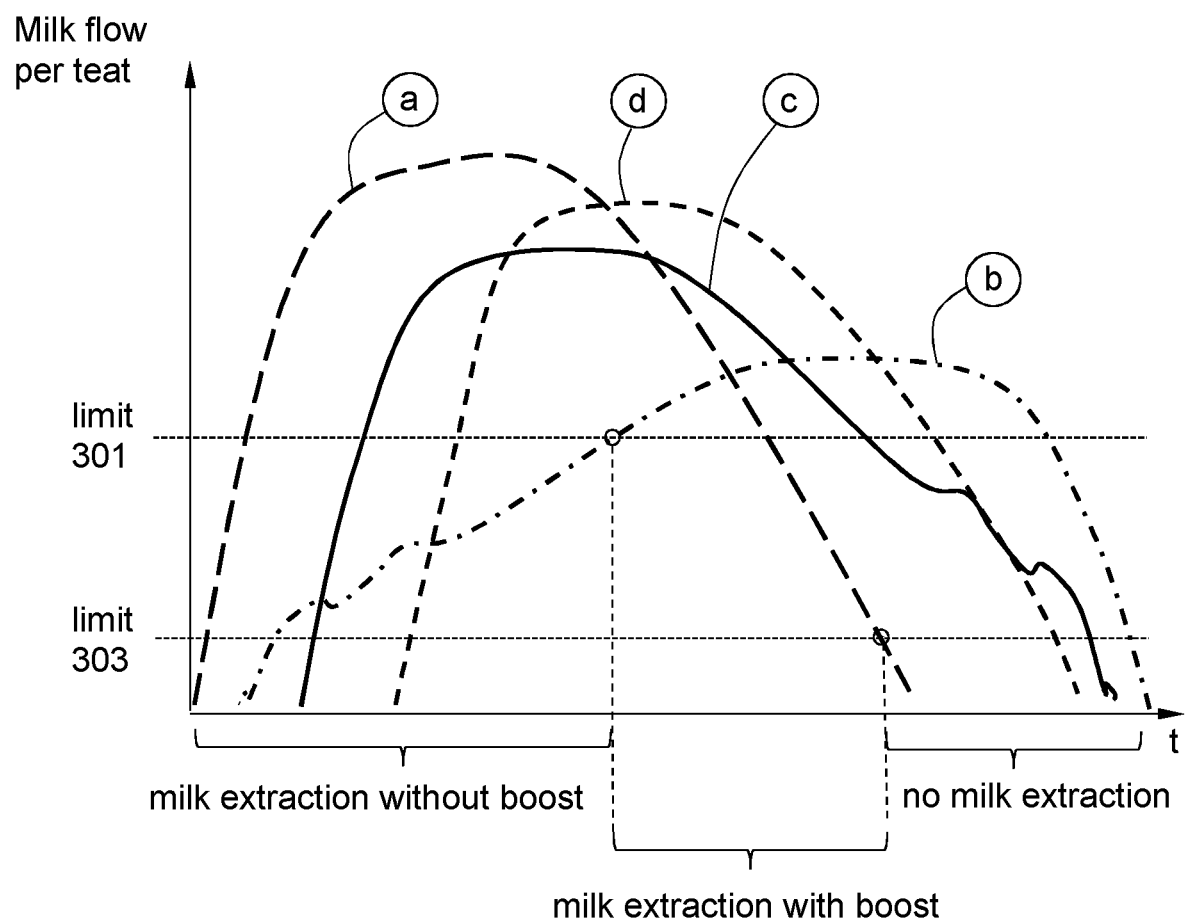
FIG. 3B is a diagram that illustrates examples of milk flow per time unit per teat during milk extraction according to an example.

FIG. 3B illustrates an embodiment in which a third threshold limit 303 has been introduced. The third threshold limit 303 may for example be set to around 240 g/minute per teat.

The boost is activated when the milk flow of the second teat b exceeds the first threshold limit 301. The high flow vacuum pressure H may then be maintained until the milk flow of the first teat a becomes lower than the third threshold limit 303. Thereafter, the vacuum pressure may be decreased from boost vacuum (high flow vacuum pressure level H) to the detachment vacuum pressure level L when the milk flow of the first teat a has decreased below the third threshold limit 303.

An advantage of the illustrated embodiment of FIG. 3B in comparison with the embodiment illustrated in FIG. 3A is that milk extraction could be made with boost for a longer time period, thereby milking the animal 110 more efficiently while decreasing the overall milking time of each served animal 110.

Figure 3C:
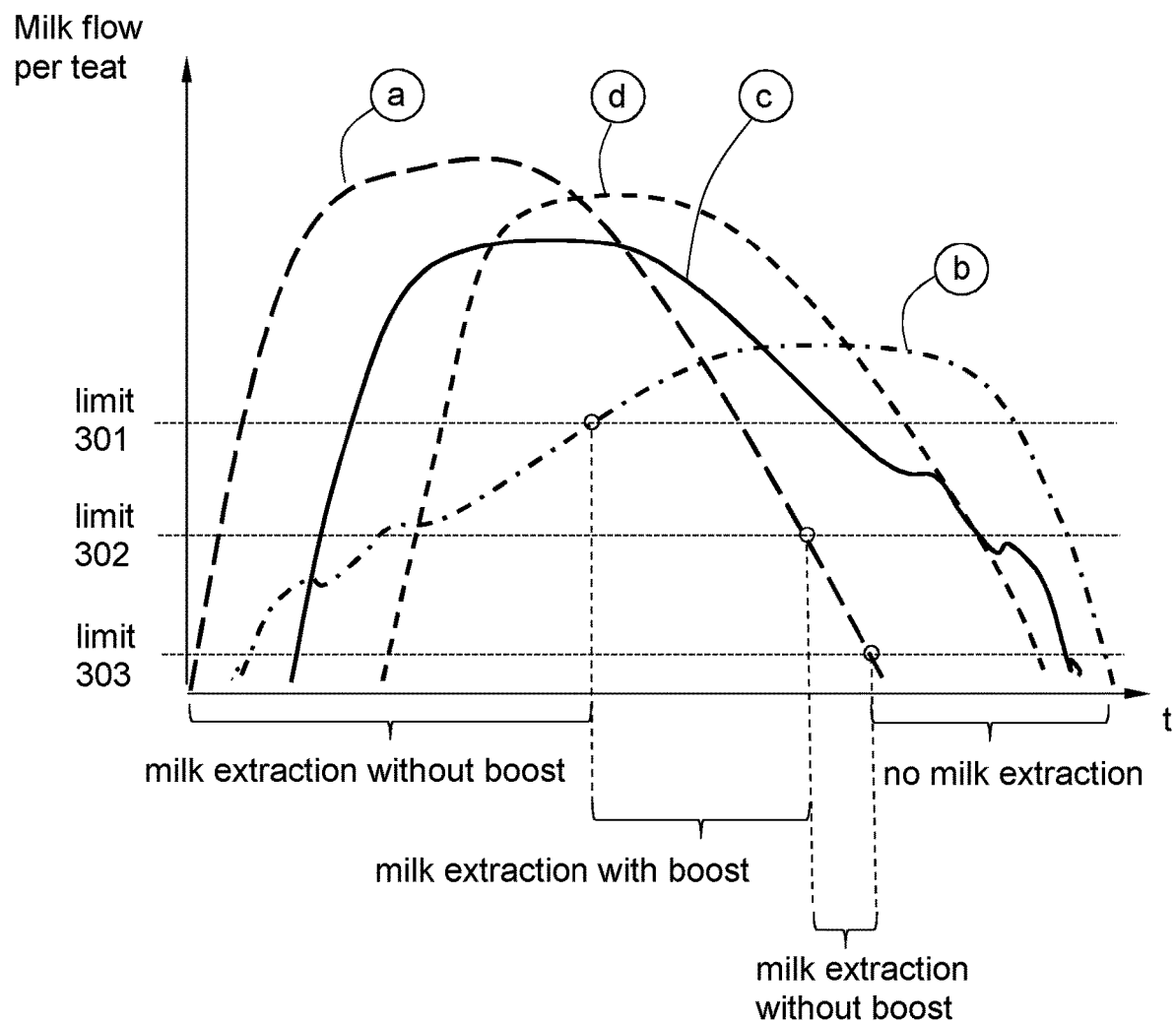
FIG. 3C is a diagram that illustrates examples of milk flow per time unit per teat during milk extraction according to an example.

FIG. 3C illustrates an embodiment in which a second threshold limit 302 has been introduced. The second threshold limit 302 may for example be set to around 350 g/minute per teat (arbitrary non limiting example), in comparison with the embodiment of FIG. 3B.

In the illustrated embodiment, just as in the above-discussed embodiments in FIG. 3A and FIG. 3B, respectively, the boost is activated when the milk flow of the second teat b exceeds the first threshold limit 301. The high flow vacuum pressure H may then be maintained until the milk flow of the first teat a becomes lower than the second threshold limit 302. The vacuum pressure may then by decreased from boost vacuum (high flow vacuum pressure level H) to the entry vacuum level E. When the milk flow of the first teat a has continued to decrease under the third threshold limit 303, the vacuum pressure may then be decreased from the entry vacuum level E to the detachment vacuum pressure level L when the milk flow of the first teat a has decreased below the third threshold limit 303.

Figure 3D:
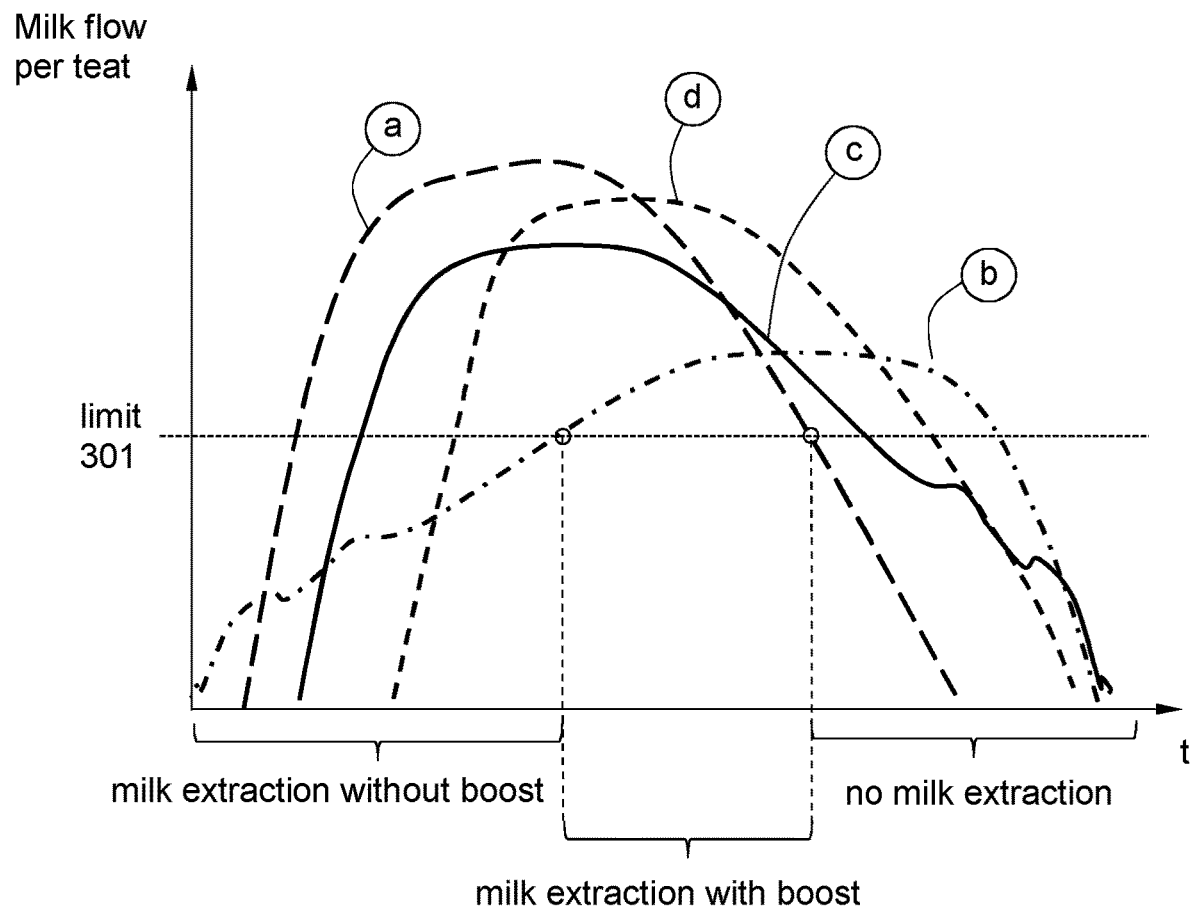
FIG. 3D is a diagram that illustrates examples of milk flow per time unit per teat during milk extraction according to an example.

FIG. 3D illustrate an alternative embodiment, wherein the teat 210a, 210b, 210c, 210d of the animal 110 which is slowest/requires most time to reach the first threshold limit 301, in this case the second teat b, has been identified and the teat cup placing device 220, to start placing the first teat cup 120a, 120b, 120c, 120d onto the determined teat 210a, 210b, 210c, 210d before sequentially applying the other teat cups 120a, 120b, 120c, 120d onto the rest of the teats 210a, 210b, 210c, 210d.

Thereby, the period of time for which boost could be applied is reached earlier for the other teats 210a, 210b, 210c, 210d. The period of time for which boost could be applied is extended in comparison with the embodiment illustrated in FIG. 3A, thereby making the milking process more efficient.

Figure 4A:
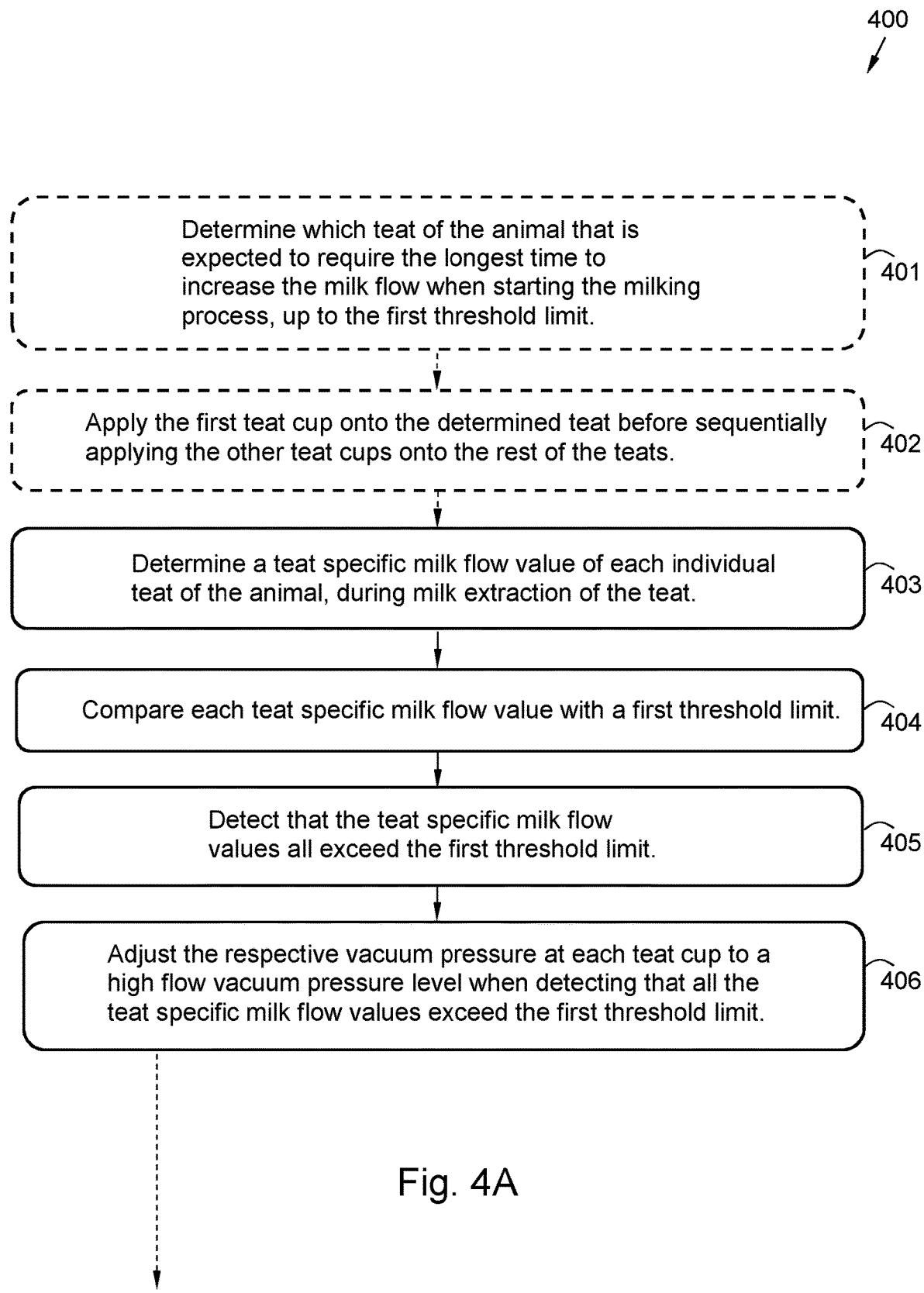
FIG. 4A is a first part of a flow chart, schematically illustrating method steps of a method according to an embodiment.

FIGS. 4A-B schematically illustrate an example of a computer-implemented method 400 according to an embodiment. The flow chart in FIGS. 4A-B shows the method 400 executed in a processing node 170, thereby enabling adjustment of a respective vacuum pressure at each teat cup 120a, 120b, 120c, 120d of a respective teat 210a, 210b, 210c, 210d of an animal 110 during milk extraction, in a milk extracting system 100.

The respective vacuum pressure is set to an entry vacuum pressure level E and one teat cup 120a, 120b, 120c, 120d is applied onto each teat 210a, 210b, 210c, 210d of the animal 110.

In order to correctly adjust the respective vacuum pressure, the method 400 may comprise a number of steps 401-410. However, some of these steps 401-410 may be performed solely in some alternative embodiments, like e.g. steps 401, 402, 407, 408, 409 and/or step 410.

Further, the described steps 401-410 may be performed in a somewhat different chronological order than the numbering suggests. The method 400 may comprise the sub-sequent steps:

Step 401, which may be performed only in some embodiments, comprises determining which teat 210a, 210b, 210c, 210d of the animal 110 that is expected to require the longest time of increasing the milk flow when starting the milking process, up to the first threshold limit 301.

This teat 210a, 210b, 210c, 210d may be determined based on historical milk flow statistics of the teats 210a, 210b, 210c, 210d of the animal 110, which may be extracted from a database in some embodiments.

Step 401 may be performed in embodiments wherein the milk extracting system 100 comprises a sensor 230, such as a camera, video camera, lidar, radar, etc., which may be configured to detect position of each teat 210a, 210b, 210c, 210d of the animal 110 and a teat cup placing device 220, or milking robot, communicatively connected to the sensor 230, which may be configured to sequentially put each of the teat cups 120a, 120b, 120c, 120d onto the respective teat 210a, 210b, 210c, 210d of the animal 110, based on sensor detections made by the sensor 230.

Step 402, which may be performed only in some embodiments wherein step 401 has been performed, comprises applying the first teat cup 120a, 120b, 120c, 120d onto the determined 401 teat 210a, 210b, 210c, 210d before sequentially applying the other teat cups 120a, 120b, 120c, 120d onto the rest of the teats 210a, 210b, 210c, 210d.

Step 403 comprises determining a teat specific milk flow value of each individual teat 210a, 210b, 210c, 210d of the animal 110, during milk extraction of the teat 210a, 210b, 210c, 210d, based on a received respective measurement of milk flow meters 160a, 160b, 160c, 160d, each configured to measure milk flow of one respective teat 210a, 210b, 210c, 210d of the animal 110.

Step 404 comprises comparing each determined 403 teat specific milk flow value with the first threshold limit 301.

Step 405 comprises detecting that all of the determined 403 teat specific milk flow values exceed the first threshold limit 301, based on the made comparison 404.

Step 406 comprises adjusting the respective vacuum pressure at each teat cup 120a, 120b, 120c, 120d from the entry vacuum pressure level E to a high flow vacuum pressure level H when detecting 405 that all the determined 403 teat specific milk flow values exceed the first threshold limit 301.

Step 407, which may be performed only in some embodiments wherein step 406 has been performed, comprises detecting that the teat specific milk flow value of one teat 210a, 210b, 210c, 210d of the animal 110 is lower than the first threshold limit 301.

In some embodiments, wherein the respective vacuum pressure at each teat cup 120a, 120b, 120c, 120d has been adjusted into the high flow vacuum pressure level H, may comprise detecting that one of the determined teat specific milk flow values is lower than a second threshold limit 302.

The first threshold limit 301 may be equal to or higher than the second threshold limit 302. Thus, both the first threshold limit 301 and the second threshold limit 302 may be set to substantially about the same value, such as e.g. 500 g/min in some embodiments. In other embodiments, the second threshold limit 302 may be somewhat lower than the first threshold limit 301, such as about 10-20% lower. In case the first threshold limit 301 is set to 500 g/min per teat, the second threshold limit 302 may be set to 450 g/min per teat, in a non-limiting example.

Step 407 may also, or alternatively comprise detecting that one of the determined teat specific milk flow values is lower than a third threshold limit 303, based on the made comparison 404.

Step 408, which may be performed only in some embodiments wherein step 407 has been performed, comprises adjusting the respective vacuum pressure at each teat cup 120a, 120b, 120c, 120d from the high flow vacuum pressure level H to a detachment vacuum pressure level L when detecting 405 that the determined teat specific milk flow value of one teat 210a, 210b, 210c, 210d of the animal 110 is lower than the first threshold limit 301.

Step 408 may in some embodiments wherein the respective vacuum pressure at each teat cup 120a, 120b, 120c, 120d has been adjusted into the high flow vacuum pressure level H, comprise adjusting the respective vacuum pressure at each teat cup 120a, 120b, 120c, 120d from the high flow vacuum pressure level H to the entry vacuum pressure level E when making the detection 407 that one of the determined teat specific milk flow values is lower than the second threshold limit 302.

Step 408 may in some embodiments comprise adjusting the respective vacuum pressure at each teat cup 120a, 120b, 120c, 120d to the detachment vacuum pressure level L when making the detection 407 that one of the determined teat specific milk flow values is lower than the third threshold limit 303.

The second threshold limit 302 may be equal to or higher than the third threshold limit 303 in some embodiments. Thus, both the second threshold limit 302 and the third threshold limit 303, as, optionally, the first threshold limit 301 may be set to substantially about the same value, such as e.g. 500 g/min in some embodiments. In other embodiments, the third threshold limit 303 may be somewhat lower than the second threshold limit 302, such as about 20-60% lower. In case the second threshold limit 302 is set to 500 g/min, the second threshold limit 302 may be set to 240 g/min, in a non-limiting example.

Step 409, which may be performed only in some embodiments wherein the respective vacuum pressure at each teat cup 120a, 120b, 120c, 120d has been adjusted 408 to the detachment vacuum pressure level L, comprises detaching all teat cups 120a, 120b, 120c, 120d from the teats 210a, 210b, 210c, 210d of the animal 110.

Step 410 may be performed only in some embodiments wherein step 409 has been performed, comprise, in some embodiments wherein the respective vacuum pressure at each teat cup 120a, 120b, 120c, 120d has been adjusted 408 to the detachment vacuum pressure level L, adjust the respective vacuum pressure at each teat cup 120a, 120b, 120c, 120d into any one of the entry vacuum pressure level E or the high flow vacuum pressure level H for a limited period of time when the teat cups 120a, 120b, 120c, 120d have been detached 409 from the teats 210a, 210b, 210c, 210d.

Thanks to the provided method 400, it is possible to dynamically adjust the milking vacuum of each teat 210a, 210b, 210c, 210d of the animal 110, depending on the current milk flow per time unit, so that no boost milking is made when the milk flow per time unit of any teat 210a, 210b, 210c, 210d is lower than the first threshold limit 301, while adjusting the milking vacuum into the high flow vacuum pressure level H when the milk flow per time unit of all the teats 210a, 210b, 210c, 210d exceeds the first threshold limit 301. Thereby the milking efficiency is improved, while eliminating or at least reducing teat damages due to excessive vacuum pressure. It is thereby estimated that teat condition of the animal 110 is increased, although more animals per time unit could be milked by the milk extracting system 100 due to the shortened milking time per animal 110.

The above described method steps 401-410 to be performed in the processing node 170 may be implemented through one or more processing circuits within the processing node 170, together with a computer program for performing at least some of the functions of the method steps 401-410. Thus, the computer program comprises instructions which, when the computer program is executed by the processing node 170 in the milk extracting system 100, cause the processing node 170 to carry out the method 400 according to at least some of steps 401-410.

The computer program mentioned above may be provided for instance in the form of a computer-readable medium, i.e. a data carrier carrying computer program code for performing at least some of the steps 401-410 according to some embodiments when being loaded into the one or more processing circuits of the processing node 170. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the processing node 170 remotely, e.g. over an Internet or an intranet connection.

The terminology used in the description of the embodiments as illustrated in the accompanying drawings is not intended to be limiting of the described computer-implemented method 400; the milk extracting system 100; the processing node 170; the computer program; and/or the computer-readable storage medium. Various changes, substitutions and/or alterations may be made, without departing from invention embodiments as defined by the appended claims. The various illustrated embodiments depicted in FIGS. 1-4B, and/or discussed in the corresponding respective section of the description may with advantage be combined with each other, for example by mixing and compiling features of some or all of the described embodiments, thereby achieving additional advantages.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage.

The invention claimed is:

1. A milk extracting system (100), comprising:
   a plurality of teat cups, configured for attachment to teats of an animal (110) during milk extraction;
   a plurality of milk evacuation tubes, each milk evacuation tube connected to a respective teat cup of said teat cups;
   a vacuum pump (130), configured to generate a vacuum pressure;

a milk tank (140), connected to each of said teat cups via the milk evacuation tubes and also connected to the vacuum pump (130);

a plurality of valve devices, each valve device configured to control a vacuum pressure applied at a corresponding one of said teat cups;

a plurality of milk flow meters, each one of said flow meters configured to measure a milk flow of one teat of the teats of the animal (110);

a processing node (170) communicatively connected to each one of the milk flow meters; and a vacuum regulator (180) configured to adjust, via the valve devices, the respective vacuum pressures at the teat cups based on instructions obtained from the processing node, wherein the processing node (170) is configured to determine a teat specific milk flow value of each individual teat of the animal (110), during milk extraction of the teat, based on milk flow measurements of each respective milk flow meter, compare each determined teat specific milk flow value with a first threshold limit (301), detect whether all of the determined teat specific milk flow values exceed the first threshold limit (301), and when all the determined teat specific milk flow values are detected as having exceeded the first threshold limit (301), generate a command to the vacuum regulator (180) to adjust each of the respective vacuum pressures at the teat cups from an entry vacuum pressure level (E) to a high flow vacuum pressure level (H), said high flow vacuum pressure level (H) being greater in magnitude than said entry vacuum pressure level (E).

2. The milk extracting system (100) according to claim 1, wherein the processing node (170) is further configured to, once the respective vacuum pressure has been adjusted into the high flow vacuum pressure level (H):

detect whether one of the determined teat specific milk flow values is lower than a second threshold limit (302), and when one of the determined teat specific milk flow values is detected as being lower than the second threshold limit (302), generate a command to the vacuum regulator (180) to adjust the vacuum pressure at each one of the teat cups from the high flow vacuum pressure level (H) to the entry vacuum pressure level (E).

3. The milk extracting system (100) according to claim 1, wherein the processing node (170) is further configured to:

detect whether one of the determined teat specific milk flow values is lower than a third threshold limit (303), and when one of the determined teat specific milk flow values is detected as being lower than the third threshold limit (303), generate a command to the vacuum regulator (180) to adjust the vacuum pressure at each one of the teat cups to a detachment vacuum pressure level (L).

4. The milk extracting system (100) according to claim 3, wherein the first threshold limit (301) is equal to or higher than the second threshold limit (302), and wherein the second threshold limit (302) is equal to or higher than the third threshold limit (303).

5. The milk extracting system (100) according to claim 1, wherein the processing node (170) is further configured to:

detect whether all of the teat cups have detached from the teats of the animal (110), and when all the teat cups have been detected as being detached from the teats, generate a command to the vacuum regulator (180) to adjust the vacuum pressure at each one of the teat cups into any one of the entry vacuum pressure level (E) and the high flow vacuum pressure level (H) for a limited period of time.

6. The milk extracting system (100) according to claim 1, further comprising:

a sensor (230) configured to detect a position of each teat of the animal (110); and a teat cup placing device (220), communicatively connected to the sensor (230), configured to sequentially put each of the teat cups onto a respective teat of the animal (110), based on sensor detections made by the sensor (230), wherein the processing node (170) is further configured to:

determine, from the teats of the animal (110), one teat that is expected to require a longest time, from a start of milking, to increase milk flow to the first threshold limit (301), and generate an instruction to the teat cup placing device (220) to place a first teat cup of the teat cups onto the one determined teat before sequentially applying other ones of the teat cups onto remaining ones of the teats.

7. A computer-implemented method (400) of adjusting respective vacuum pressures at teat cups of a milk extracting system (100) during a milk extraction operation, each one of the teat cups applied onto a respective teat of the animal (110) to be milked, and the respective vacuum pressures at the teat cups is set to an entry vacuum pressure level (E), the method (400) comprising the steps of:

determining (403), via measurements from milk flow meters, a teat specific milk flow value of each teat of the animal (110) during milk extraction of the teat, each milk flow meter configured to measure a milk flow of one respective teat of the animal (110);

comparing (404) each determined (403) teat specific milk flow value with a first threshold limit (301);

detecting (405) whether all of the determined (403) teat specific milk flow values exceed the first threshold limit (301); and determining that all the determined teat specific milk flow values in said detecting step have exceeded the first threshold limit (301), and adjusting (406) each of the respective vacuum pressures of the teat cups from the entry vacuum pressure level (E) to a high flow vacuum pressure level (H), said high flow vacuum pressure level (H) having being greater in magnitude than said entry vacuum pressure level (E).

8. The method (400) according to claim 7, further comprising:

detecting (407) whether one of the teat specific milk flow values is lower than a second threshold limit (302), determining that the teat specific milk flow values are detected as being lower than the second threshold limit (302), and adjusting the respective vacuum pressures of the teat cups from the high flow vacuum pressure level (H) to the entry vacuum pressure level (E).

9. The method (400) according to claim 7, further comprising:

detecting (407) whether one of the teat specific milk flow values is lower than a third threshold limit (303), determining that the teat specific milk flow values are detected as being lower than the third threshold limit (303), and adjusting the respective vacuum pressures of the teat cups to a detachment vacuum pressure level (L), and detaching (409) all the teat cups from the teats of the animal (110).

10. The method (400) according to claim 9, further comprising:
when the teat cups have been detached (409) from the teats, adjusting (410) the respective vacuum pressures of the teat cups to any one of the entry vacuum pressure level (E) and the high flow vacuum pressure level (H) for a limited period of time.

11. The method (400) according to claim 9,
wherein the first threshold limit (301) is equal to or higher than the second threshold limit (302), and
wherein the second threshold limit (302) is equal to or higher than the third threshold limit (303).

12. The method (400) according to claim 7, further comprising:
determining (401), from the teats of the animal (110), one teat that is expected to require a longest time, from a start of milking, to increase milk flow to the first threshold limit; and
applying (402) a first teat cup onto the one determined (401) teat before sequentially applying other ones of the teat cups onto remaining ones of the teats.

13. A non-transitory computer-readable storage medium comprising instructions which, when executed by a computer, cause a processor of a computer to carry out the steps of the method (400) according to claim 7.

* * * * *